(12) United States Patent
Sylvain

(10) Patent No.: US 7,844,270 B2
(45) Date of Patent: Nov. 30, 2010

(54) CALL TRANSFER FOR AN INTEGRATED WIRELINE AND WIRELESS SERVICE USING A TEMPORARY DIRECTORY NUMBER

(75) Inventor: Dany Sylvain, Gatineau (CA)

(73) Assignee: Nortel Networks Limited, St. Laurent, Quebec (CA)

(*) Notice: Subject to any disclaimer, the term of this patent is extended or adjusted under 35 U.S.C. 154(b) by 58 days.

(21) Appl. No.: 10/693,539

(22) Filed: Oct. 24, 2003

(65) Prior Publication Data
US 2004/0235483 A1 Nov. 25, 2004

Related U.S. Application Data

(60) Provisional application No. 60/472,277, filed on May 21, 2003.

(51) Int. Cl.
H04W 36/00 (2009.01)
H04W 4/00 (2009.01)
H04W 40/00 (2009.01)
H04M 1/00 (2006.01)

(52) U.S. Cl. .................. 455/436; 455/552.1; 455/553.1; 455/426.1; 455/432.1; 455/435.1; 455/439; 455/442; 455/445

(58) Field of Classification Search .............. 455/552.1, 455/553.1, 445, 462, 436, 426.1, 426.2, 432.1, 455/435.1, 435.2, 439, 440, 442
See application file for complete search history.

(56) References Cited

U.S. PATENT DOCUMENTS 5,260,988 A * 11/1993 Schellinger et al. ...... 455/552.1
5,579,375 A * 11/1996 Ginter ......................... 455/417
5,659,598 A  8/1997 Byrne et al. ............... 455/436
5,722,068 A * 2/1998 Bartle et al. ................ 455/421

(Continued)

FOREIGN PATENT DOCUMENTS

WO        02/19750        3/2002

(Continued)

OTHER PUBLICATIONS

Adachi et al, "A Handoff Examination of a Hybrid System Using Cellular and Ad-Hoc Modes," IEICE Transactions on Communications, Institute of Electronics Information and Communications Enginerring, Tokyo, Japan, Nov. 2000, vol. E83-B, No. 11, pp. 2494-2500, XP001065366.

(Continued)

*Primary Examiner*—George Eng
*Assistant Examiner*—Wesley L Kim
(74) *Attorney, Agent, or Firm*—Withrow & Terranova, PLLC

(57) ABSTRACT

The present invention relates to a communication environment where calls are established with a single mobile terminal through either a wireless network or the public switched telephone network (PSTN) via a terminal adaptor, which is capable of wirelessly communicating with the mobile terminal. As such, the mobile terminal may facilitate traditional cellular calls via the wireless network, or traditional PSTN calls via the terminal adaptor. A temporary directory number for the mobile terminal is provided by the wireless network and used for facilitating calls via the wireless network. The terminal adaptor, supporting telephony switch, and wireless network will cooperate to transfer calls to the wireless network as necessary or desired.

40 Claims, 7 Drawing Sheets

U.S. PATENT DOCUMENTS

| | | | |
|---|---|---|---|
| 5,737,703 A | 4/1998 | Byrne | |
| 5,751,789 A | 5/1998 | Farris et al. | 379/34 |
| 5,890,054 A | 3/1999 | Logsdon et al. | |
| 5,901,359 A * | 5/1999 | Malmstrom | 455/461 |
| 5,920,815 A * | 7/1999 | Akhavan | 455/426.1 |
| 5,940,756 A | 8/1999 | Sibecas et al. | |
| 6,014,377 A | 1/2000 | Gillespie | 370/351 |
| 6,052,597 A | 4/2000 | Ekstrom | |
| 6,104,799 A | 8/2000 | Jain et al. | |
| 6,154,650 A * | 11/2000 | Abidi et al. | 455/433 |
| 6,181,938 B1 | 1/2001 | Salmela et al. | 455/433 |
| 6,243,581 B1 | 6/2001 | Jawanda | |
| 6,327,470 B1 | 12/2001 | Ostling | |
| 6,363,246 B1 | 3/2002 | Williams et al. | 455/403 |
| 6,373,828 B1 | 4/2002 | Stewart et al. | |
| 6,411,802 B1 | 6/2002 | Cardina et al. | 455/404 |
| 6,424,647 B1 | 7/2002 | Ng et al. | 370/352 |
| 6,438,384 B1 | 8/2002 | Chen | 455/462 |
| 6,445,921 B1 * | 9/2002 | Bell | 455/426.1 |
| 6,633,636 B1 | 10/2003 | McConnell et al. | |
| 6,766,170 B1 | 7/2004 | Aretz et al. | |
| 6,791,988 B1 | 9/2004 | Hameleers et al. | |
| 6,940,844 B2 | 9/2005 | Purkayastha et al. | |
| 6,941,156 B2 | 9/2005 | Mooney | 455/553.1 |
| 6,985,720 B2 | 1/2006 | Qu et al. | |
| 6,987,988 B2 | 1/2006 | Uchiyama | 455/557 |
| 7,043,248 B2 | 5/2006 | Hallenstal et al. | |
| 7,058,415 B2 | 6/2006 | Bushnell et al. | |
| 7,136,375 B1 | 11/2006 | Koistinen | |
| 7,522,632 B2 | 4/2009 | La Porta et al. | |
| 2002/0024947 A1 | 2/2002 | Luzzatti et al. | |
| 2002/0061744 A1 * | 5/2002 | Hamalainen et al. | 455/426 |
| 2002/0085516 A1 | 7/2002 | Bridgelall | 370/329 |
| 2002/0106028 A1 * | 8/2002 | Thyssen | 375/243 |
| 2002/0110112 A1 | 8/2002 | Tuomi | 370/352 |
| 2002/0147008 A1 | 10/2002 | Kallio | 455/426 |
| 2003/0008682 A1 | 1/2003 | Emerson, III | 455/557 |
| 2003/0134650 A1 * | 7/2003 | Sundar et al. | 455/465 |
| 2003/0214940 A1 | 11/2003 | Takken | 370/352 |
| 2003/0224795 A1 | 12/2003 | Wilhoite et al. | |
| 2004/0132485 A1 * | 7/2004 | Charney et al. | 455/552.1 |
| 2004/0160932 A1 | 8/2004 | Yegoshin | |
| 2004/0202940 A1 | 10/2004 | Kramer et al. | |
| 2004/0203606 A1 | 10/2004 | Souissi et al. | |
| 2005/0148353 A1 | 7/2005 | Hicks, III et al. | |
| 2005/0159153 A1 | 7/2005 | Mousseau et al. | |

FOREIGN PATENT DOCUMENTS

| | | |
|---|---|---|
| WO | 02/19750 A1 | 3/2002 |

OTHER PUBLICATIONS

International Search Report for PCT/IB2004/001668, mailed Jul. 5, 2005.

International Search Report for PCT/IB2004/001672 mailed Jan. 27, 2005.

International Search Report for PCT/IB2004/001668 mailed Jul. 5, 2005.

Adachi et al., "A Handoff Examination of a Hybrid System Using Cellular and Ad-Hoc Modes," IEICE Transactions on Communications, Institute of Electronics Information and Communications Engineering, Tokyo, Japan, Nov. 2000, vol. E83-B, No. 11, pp. 2494-2500, XP001065366.

A Report on the Status of Wireless Access to 2-1-1, Mar. 2003, by Strover and Cunningham pp. 8-10.

* cited by examiner

CALL TRANSFER FOR AN INTEGRATED WIRELINE AND WIRELESS SERVICE USING A TEMPORARY DIRECTORY NUMBER

This application claims the benefit of U.S. provisional patent application Ser. No. 60/472,277, filed May 21, 2003, the disclosure of which is hereby incorporated by reference in its entirety.

CROSS-REFERENCE TO RELATED APPLICATIONS

This application is related to U.S. patent application Ser. No. 10/693,540, filed Oct. 24, 2003, entitled CALL TRANSFER FOR AN INTEGRATED WIRELINE AND WIRELESS SERVICE USING A TEMPORARY DIRECTORY NUMBER, the disclosure of which is incorporated herein by reference in its entirety.

FIELD OF THE INVENTION

The present invention relates to mobile communications, and in particular to allowing a single mobile terminal to transition from communicating over the public switched telephone network to communicating over a wireless network.

BACKGROUND OF THE INVENTION

Today's telephony users generally have at least one wireline-based telephone receiving services through the public switched telephone network (PSTN) and a mobile telephone receiving services through a cellular network. These wireline and mobile telephones are incompatible, and are thus incapable of facilitating communications over both the cellular and public switched networks. As such, telephony users must juggle multiple telephones, using one telephone to make and receive calls via the cellular network, and another to make and receive calls via the PSTN. Given the multiple telephones, callers must keep track of multiple directory numbers. Additionally, incoming calls are generally free through the service providers of the PSTN, while cellular service providers charge for such incoming calls. Accordingly, there is a need for a technique to allow a single telephony device to interface with both the cellular network and the PSTN in an effective and efficient manner. There is also a need to provide an efficient transfer mechanism to transition a call through the PSTN to a call through the cellular network, when communications via the PSTN are no longer possible.

SUMMARY OF THE INVENTION

The present invention relates to a communication environment where calls are established with a single mobile terminal through either a wireless network or the public switched telephone network (PSTN) via a terminal adaptor, which is capable of wirelessly communicating with the mobile terminal. As such, the mobile terminal may facilitate traditional cellular calls via the wireless network, or traditional PSTN calls via the terminal adaptor. The terminal adaptor and mobile terminal communicate via a local wireless interface, and as such, communications via the PSTN through the terminal adaptor are only possible within a limited communication zone supported by the terminal adaptor. When the mobile terminal is involved in a call and within the communication zone of the terminal adaptor, calls are facilitated via the wireless interface with the terminal adaptor. As the mobile terminal approaches the outer limits of the communication zone, the terminal adaptor will detect a decrease in its ability to facilitate effective communications with the mobile terminal and trigger the supporting telephony switch to effectively transfer the call to the mobile terminal through the wireless network, as well as register with the wireless network, if registration has not already taken place. Preferably, the mobile terminal is associated with a primary directory number that is associated with the PSTN. A temporary directory number for the mobile terminal is provided by the wireless network and is used for facilitating incoming calls, outgoing calls, and service transitions between the PSTN and wireless network.

The mobile terminal will simply answer the new incoming call made to the temporary directory number associated with the mobile terminal when served by the wireless network. This effects a transition from the PSTN connection to the wireless connection. The terminal adaptor may interact with the supporting telephony switch to assist in establishing the call, as well as effecting the transition. The transition may be implemented by using a traditional call transfer technique, the technique used when establishing a three-way call, or any other technique for allowing a telephony switch to change the telephony connection from one directory number to another.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a communication environment according to one embodiment of the present invention.

FIGS. 2A-2C provide a communication call flow diagram wherein a mobile terminal moves out of range of PSTN communications via a terminal adaptor.

DETAILED DESCRIPTION OF THE PREFERRED EMBODIMENTS

Figure 1:
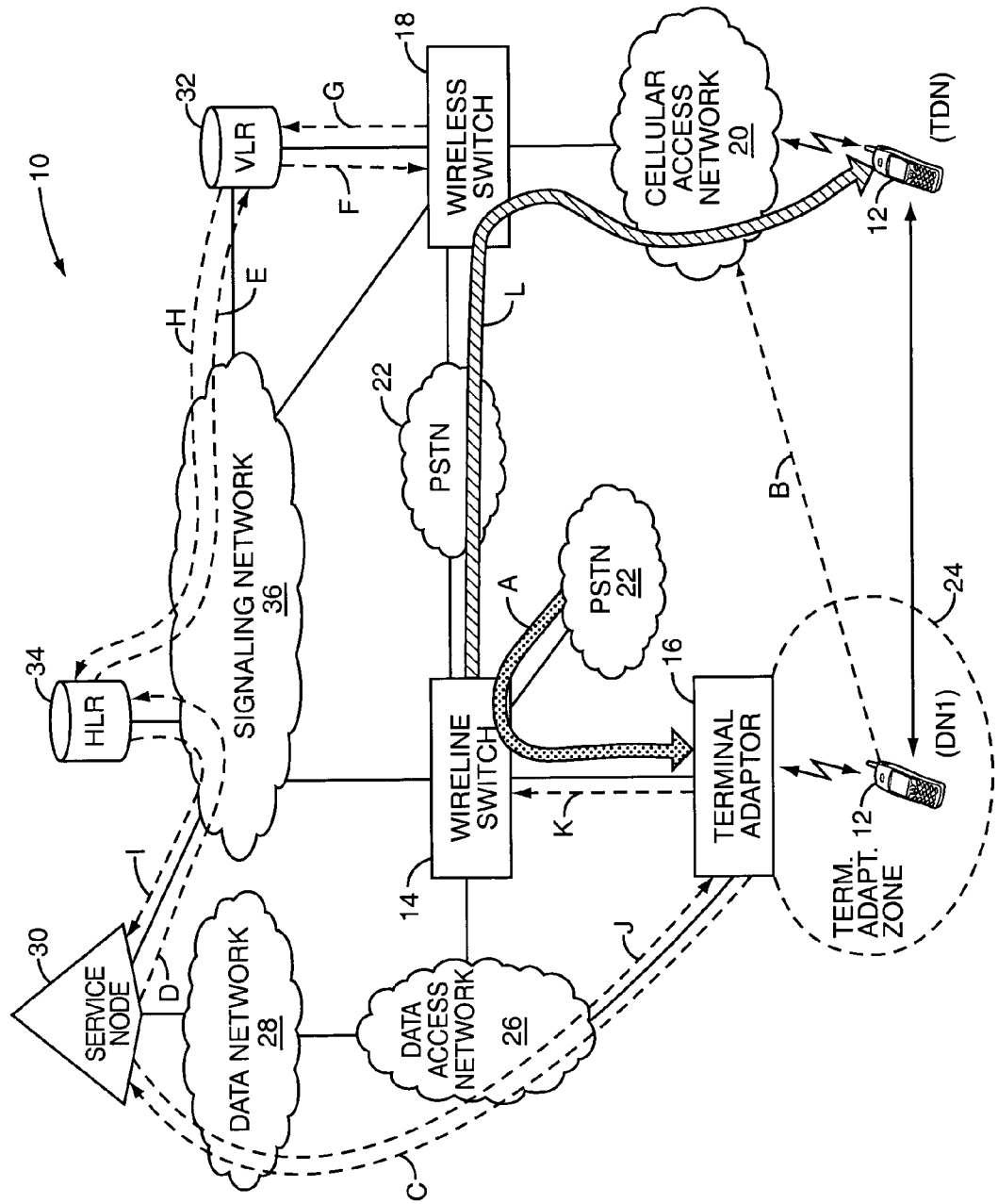

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to providing a mobile terminal that is capable of communication via a cellular-based wireless network, as well as via the public switched telephone network (PSTN) through a terminal adaptor. The terminal adaptor is coupled to the PSTN in traditional fashion, and communicates wirelessly with the mobile terminal using local wireless access technology, such as traditional analog and digital cordless technologies, 802.11 wireless local area network technologies, and Bluetooth technology. The mobile terminal is preferably associated with a primary directory number for PSTN access, and is associated with a temporary directory number for cellular access. Communications with the wireless network can use any available cellular access technology, such as time division multiple access (TDM), code division multiple access (CDMA), and orthogonal frequency division multiple access (OFDM).

In addition to connecting to the PSTN and providing wireless access for the mobile terminal, the terminal adaptor may have a data interface through which the terminal adaptor can communicate with a service node, which controls the routing of incoming calls directed to the mobile terminal. The terminal adaptor will determine when the mobile terminal is within a zone in which communication via the local wireless access technology is possible, and provide information to the service node bearing on whether the mobile terminal is within or outside of the zone. The service node will take this information and direct incoming calls to the PSTN directory number for the mobile terminal associated with the terminal adaptor when the mobile terminal is within the zone, and direct calls to the temporary directory number associated with the wireless network when the mobile terminal is outside of the zone. As such, incoming calls are either routed through the wireless network or through the PSTN to the terminal adaptor, depending on whether the terminal adaptor can effectively communicate with the mobile terminal.

Regardless of whether a PSTN call is originated from or received by the mobile terminal via the terminal adaptor, the present invention provides for transferring the connection for the call such that it is reestablished through the wireless network when the mobile terminal moves outside of the zone of the terminal adaptor. Preferably, the terminal adaptor or mobile terminal will monitor the quality of the call or other indicia indicative of the ability of the terminal adaptor to effectively communicate with the mobile terminal, to determine whether or not the mobile terminal is within or outside of the zone. When the mobile terminal leaves the zone, the terminal adaptor will initiate a transition of the call to the temporary directory number for the mobile terminal, which is associated with the wireless network. Preferably, the terminal adaptor will trigger the telephony switch to transfer the call, and once the connection through the wireless network is established, drop the connection to the terminal adaptor. Those skilled in the art will recognize numerous techniques for triggering the servicing telephony switch to initiate a call to the mobile terminal via the wireless network directory number, such as in traditional call transfer, establishing a three-way call, or simply establishing separate telephony connections. In addition to the telephone line connecting to the terminal adaptor, the call can alternatively be routed, using standard packet telephony, via a data network and data access network to the terminal adaptor, first going through a telephony gateway connected to the telephony switch. The following description will enable those skilled in the art to practice the invention. An overview of an exemplary network architecture is provided prior to delving into the operation of the preferred embodiments of the present invention.

With reference to FIG. 1, a communication environment 10 allows a mobile terminal 12 to communicate via a wireline switch 14 through a terminal adaptor 16, as well as via a wireless switch 18 through a cellular access network 20. The wireline and wireless switches 14, 18 may be operatively coupled via one or more portions of the public switched telephone networks (PSTN) 22, and may be based on time-division multiplex (TDM) or packet technology. The wireline switch 14 may also be embodied in a private branch exchange (PBX).

The terminal adaptor 16 interfaces with a telephone line connected to the wireline switch 14, and facilitates wireless communications with the mobile terminal 12. For an incoming or outgoing call via the telephone line, the terminal adaptor 16 will provide a circuit-switched interface to the telephone line and a wireless interface to the mobile terminal 12, wherein the mobile terminal 12 may operate similarly to a traditional cordless telephone.

The wireless interface provided by the terminal adaptor 16 will have a limited range, and as such, will provide a terminal adaptor zone 24, which defines an area or range in which communications between the terminal adaptor 16 and the mobile terminal 12 are possible. The terminal adaptor 16, through any of a variety of possible techniques, will determine whether the mobile terminal 12 is within the terminal adaptor zone 24, and provide information bearing on the presence of the mobile terminal 12 through a data access network 26 and data network 28 to a service node 30, directly or via customer premise equipment (not shown). The customer premise equipment may be a cable modem, Digital Subscriber Line (DSL) modem, Integrated Services Digital Network (ISDN) modem, or like communication terminal that provides access to the data access network 26 via the corresponding cable network, Digital Subscriber Line (DSL) network, or IDSN forming the data access network 26.

The service node 30 is configured to interact with the wireline switch 14 via a network and any necessary translation devices (not shown) to assist in routing incoming calls directed to the mobile terminal 12. Preferably, communications with the wireline switch 14 use Intelligent Network (IN) signaling, and communications with the terminal adaptor 16 are implemented using the Session Initiation Protocol (SIP); however, those skilled in the art will recognize the applicability of alternative signaling technologies and protocols. Alternatively, the service node functionality may be implemented in the wireline switch 14.

In the illustrated embodiment, assume a directory number DN1 is provisioned for the telephony line connected to the terminal adaptor 16, and thus, calls to directory number DN1 will be directed to the mobile terminal 12 via the terminal adaptor 16 when the mobile terminal 12 is within the terminal adaptor zone 24, or ultimately via the cellular access network 20 when the mobile terminal 12 is not within the terminal adaptor zone 24 or as desired by the user. Techniques for routing the call via the cellular access network 20 are described further below.

Incoming calls using the PSTN directory number DN1 are routed to the wireline switch 14, which is provisioned to access the service node 30 to determine how to further route the call for termination. The service node 30 will receive a message from the wireline switch 14 identifying the directory number associated with the called party for the incoming call. From the directory number, the service node 30 will recognize that the directory number DNI is associated with the mobile terminal 12. As such, the service node 30 will determine whether the mobile terminal 12 is within the terminal adaptor zone 24 of the terminal adaptor 16 based on a query to the terminal adaptor 16 or information provided by the terminal adaptor 16 on a periodic basis. If the mobile terminal 12 is within the terminal adapter zone 24, the service node 30 will send a message to the wireline switch 14 directing the wireline switch 14 to route the incoming call to the mobile terminal 12 via the terminal adaptor 16 using the PSTN directory number DN1. If the mobile terminal 12 is not within the terminal adaptor zone 24, the service node 30 will instruct the wireline switch 14 to route the call to the mobile terminal 12 through the cellular access network 20 using a temporary directory number. The temporary directory number is retrieved from the wireless switch 18 or an associated visiting location register (VLR) 32 via a signaling network 36, directly or indirectly via a home location register (HLR) 34 associated with the wireline switch 14.

The VLR 32 generally operates in traditional fashion, and may be specially configured to provide or access the temporary directory number from the wireless switch 18 currently servicing the mobile terminal 12. The HLR 34, although associated with the wireline switch 14, operates in an analogous fashion to a wireless-based HLR 34. In operation, the HLR 34 and VLR 32 cooperate to provide the temporary directory number to the service node 30. The service node 30 will provide the temporary directory number to the wireline switch 14, such that the incoming call can be directed to the wireless switch 18, if the mobile terminal 12 is not within the terminal adaptor zone 24 or as directed by the user. For additional information related to routing incoming calls via the terminal adaptor 16 or the wireless network 18, please see U.S. application Ser. No. 10/409,280 filed Apr. 8, 2003, U.S. application Ser. No. 10/409,290 filed Apr. 8, 2003, U.S. application Ser. No. 10/410,949 filed Apr. 10, 2003, and U.S. application Ser. No. 10/411,159 filed Apr. 10, 2003, the disclosures of which are incorporated herein by reference in their entireties.

The terminal adaptor 16 may support multiple mobile terminals 12, which are capable of establishing telephony communications via the wireless switch 18 or via the wireline switch 14 through the terminal adaptor 16. Accordingly, the terminal adaptor 16 may be able to keep track of the multiple mobile terminals 12 to determine whether they are present within the terminal adaptor zone 24 and report such information to the service node 30 periodically or when attempting to terminate an incoming call. Since the terminal adaptor 16 can communicate via the data access network 26 in addition to communicating over the telephone line, voice over packet conunnications are possible between the wireline switch 14 and the terminal, adaptor 16.

Regardless of the originating party to a call, when the user engaged in the call takes the mobile terminal 12 outside of the terminal adaptor zone 24, the ability of the terminal adaptor 16 to effectively communicate with the mobile terminal 12 will diminish, and ultimately stop. Accordingly, the terminal adaptor 16 (or the mobile terminal 12) will directly or indirectly monitor metrics indicative of its ability to maintain communications with the mobile terminal 12. The metrics that the terminal adaptor 16 (or the mobile terminal 12) may monitor could include actual bit error rates, signal strengths, signal-to-interference ratios, or any other indication bearing on the ability to provide a minimum level of quality. Once the metric measurement has dropped below a minimum threshold, which is indicative of the mobile terminal 12 leaving the terminal adaptor zone 24, the terminal adaptor 16 will signal the wireline switch 14 to initiate a call to the mobile terminal 12 using a temporary directory number (TDN), transfer the call to the new connection established via the wireless switch 18, and drop the connection via the terminal adaptor 16.

Preferably, the terminal adaptor 16 will provide the temporary directory number to the wireline switch 14 through signaling. Typically, a flash signal (a quick onhook/offhook transition) may be sent to the wireline switch 14 to signal the desire to transfer the call to another number. The terminal adaptor 16 may be configured to automatically provide the flash signal when it determines that the call must be transferred through the wireless switch 18. Further, the terminal adaptor 16 may be configured to actually dial the temporary directory number, and have the wireline switch 14 transfer the user's ongoing call from the PSTN directory number DN1 to the temporary directory number. Those skilled in the art will recognize various other techniques for switching from the PSTN call to a wireless call.

Notably, just prior to or during transfer, the terminal adaptor 16 may insert tones or other signals into the voice path to alert both parties involved in the call that the transfer will take place. Further, the terminal adaptor 16 may be configured to receive a signal from the mobile terminal 12 to proactively request a transfer of the call to the wireless directory number. As such, the user may simply press a key on the mobile terminal 12, which sends a signal capable of being detected by the terminal adaptor 16. Upon receipt of the signal, the terminal adaptor 16 will effect the transfer to the wireless directory number.

Continuing with FIG. 1, a high level process for accessing a temporary directory number and facilitating a transfer of a call to the mobile terminal 12 from the terminal adaptor 16 through the to the cellular access network 20 is provided. Initially, an incoming call intended for the mobile terminal 12 using directory number DN1 is connected to the terminal adaptor 16, which will facilitate bi-directional communications to support the call with the mobile terminal 12 (step A). At some point, either before the call, during the call, or when either the mobile terminal 12 or terminal adaptor 16 detects that the mobile terminal 12 is leaving the terminal adaptor zone 24, the mobile terminal 12 will initiate cellular registration via the cellular access network 20 (step B). The cellular registration may take place while the call via the terminal adaptor 16 is in progress, and as such, the mobile terminal 12 must be configured to facilitate wireless communications with the terminal adaptor 16 as well as communications with the cellular access network 20. Upon registration with the cellular access network 20, the mobile terminal 12 is assigned the temporary directory number by the wireless switch 18 or other appropriate entity, including the VLR 32. The temporary directory number must be provided to the wireline switch 14 to establish a connection with the mobile terminal 12 via the wireless switch 18 and the associated cellular access network 20.

To obtain the temporary directory number for the wireline switch 14, the terminal adaptor 16 will sense the need to transfer the call via the cellular access network 20 to the mobile terminal 12 and send a request to retrieve the temporary directory number to the service node 30 via the data access network 26 and data network 28 (step C). The service node 30 will then take the necessary steps to access the temporary directory number, directly or indirectly from the VLR 32 or wireless switch 18, depending on where the temporary directory number is stored in association with the registration for the mobile terminal 12. In the illustrated embodiment, the service node 30 will send a request for the temporary directory number to the HLR 34 (step D), which will send a request to the appropriate VLR 32 (step E), which is associated with the cellular access network 20 currently servicing the mobile terminal 12. If the VLR 32 does not have the temporary directory number for the mobile terminal 12, a request may be made of the wireless switch 18 (step F) or other entity having the temporary directory number. Assuming the wireless switch 18 keeps track of the temporary directory number, the wireless switch 18 will respond to the request from the VLR 32 by returning the temporary directory number (step G). The VLR 32 will then forward the temporary directory number to the HLR 34 (step H), which will in turn forward the temporary directory number to the service node 30 (step I).

Once the service node 30 obtains the temporary directory number, it will send it to the terminal adaptor 16 (step J), which will send the temporary directory number to the wireline switch 14 (step K) to initiate transferring the call through the cellular access network 20 from the terminal adaptor 16. The wireline switch 14 will receive the request with the temporary directory number and initiate a connection with the mobile terminal 12 via the wireless switch 18 and cellular access network 20 (step L). Once this connection is established, the incoming call is connected through the wireless switch 18 and cellular access network 20, while the connection from the wireline switch 14 to the terminal adaptor 16 is dropped.

Figure 2A:
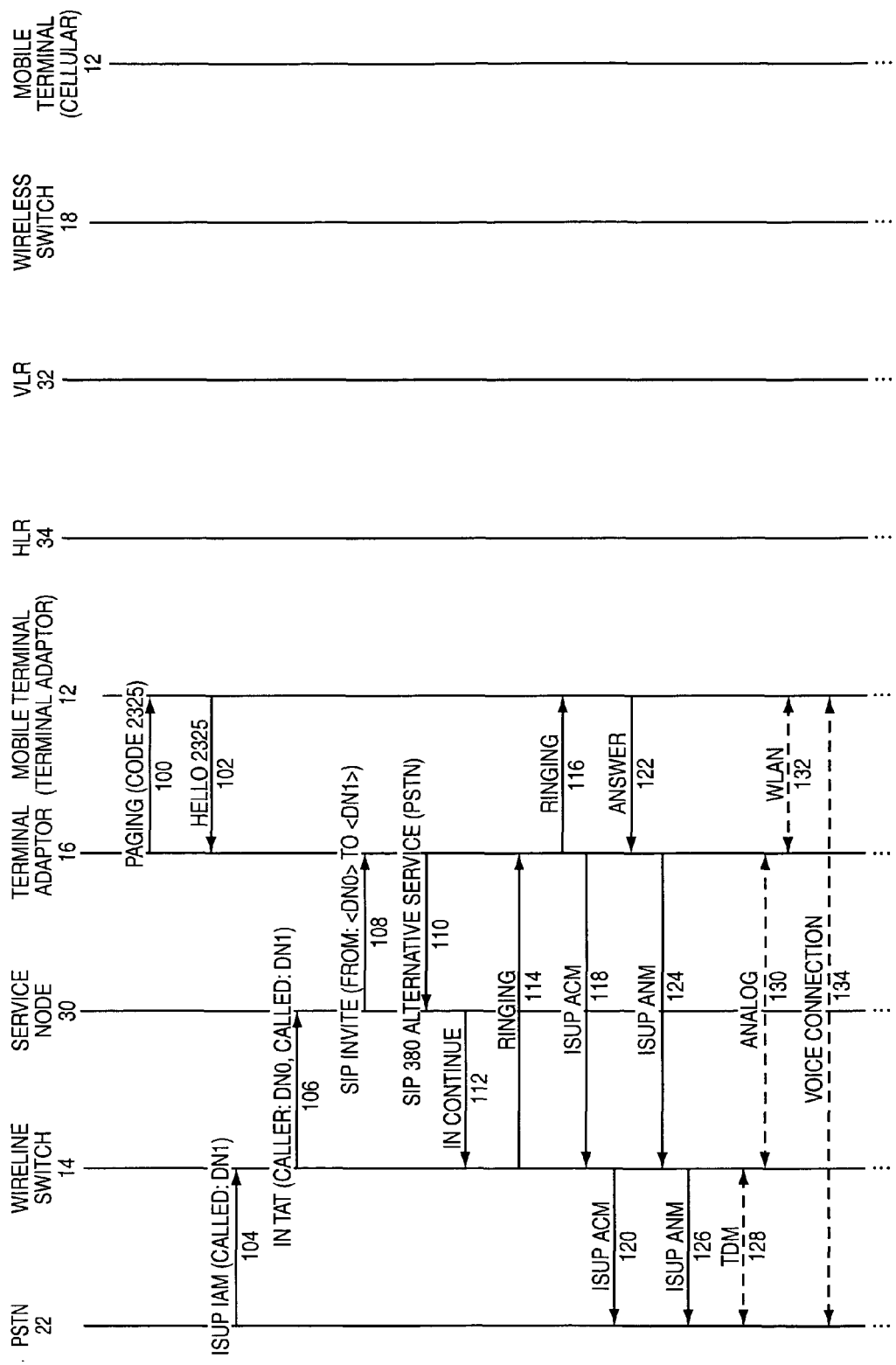
Figure 2B:
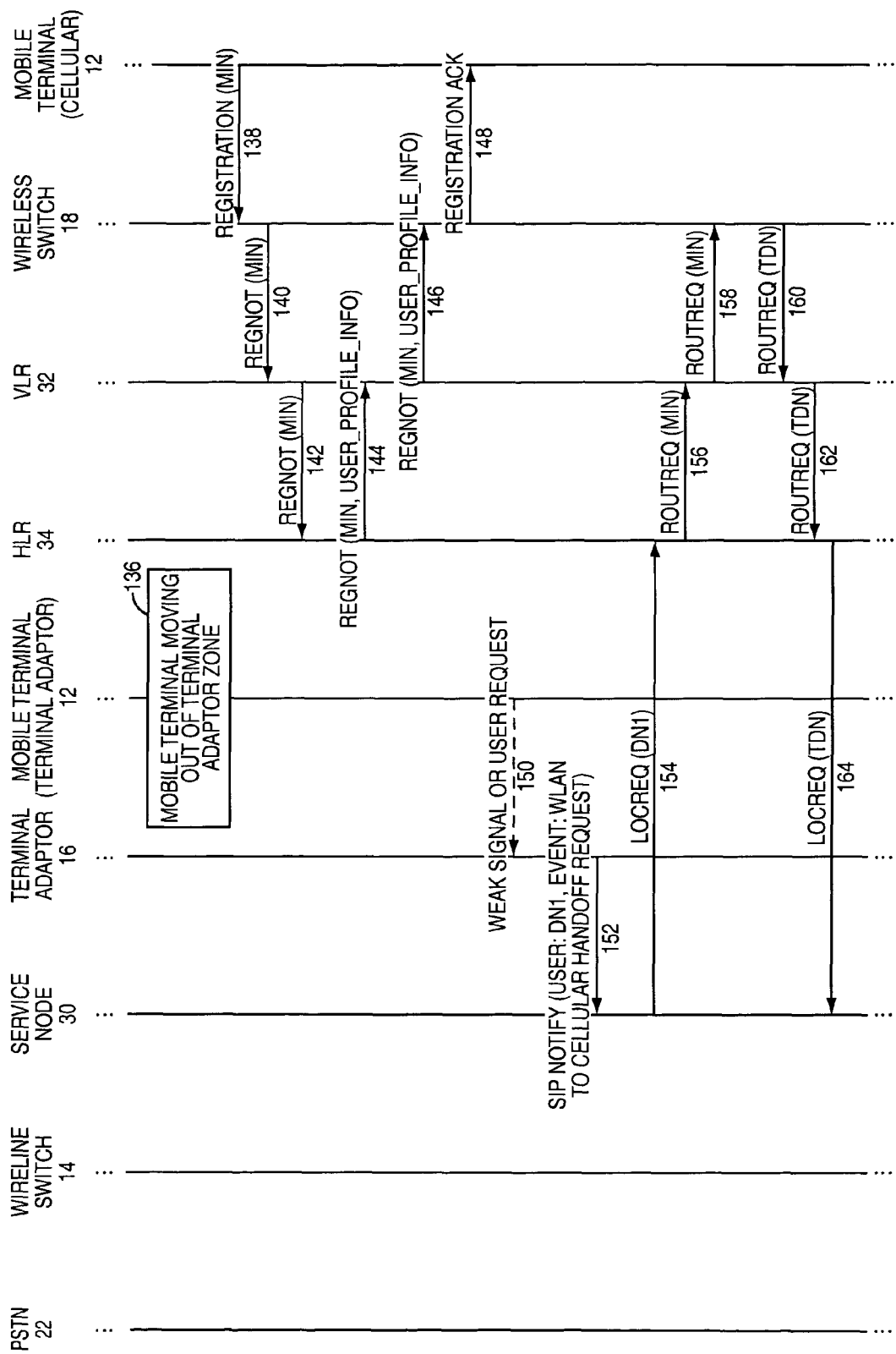
Figure 2C:
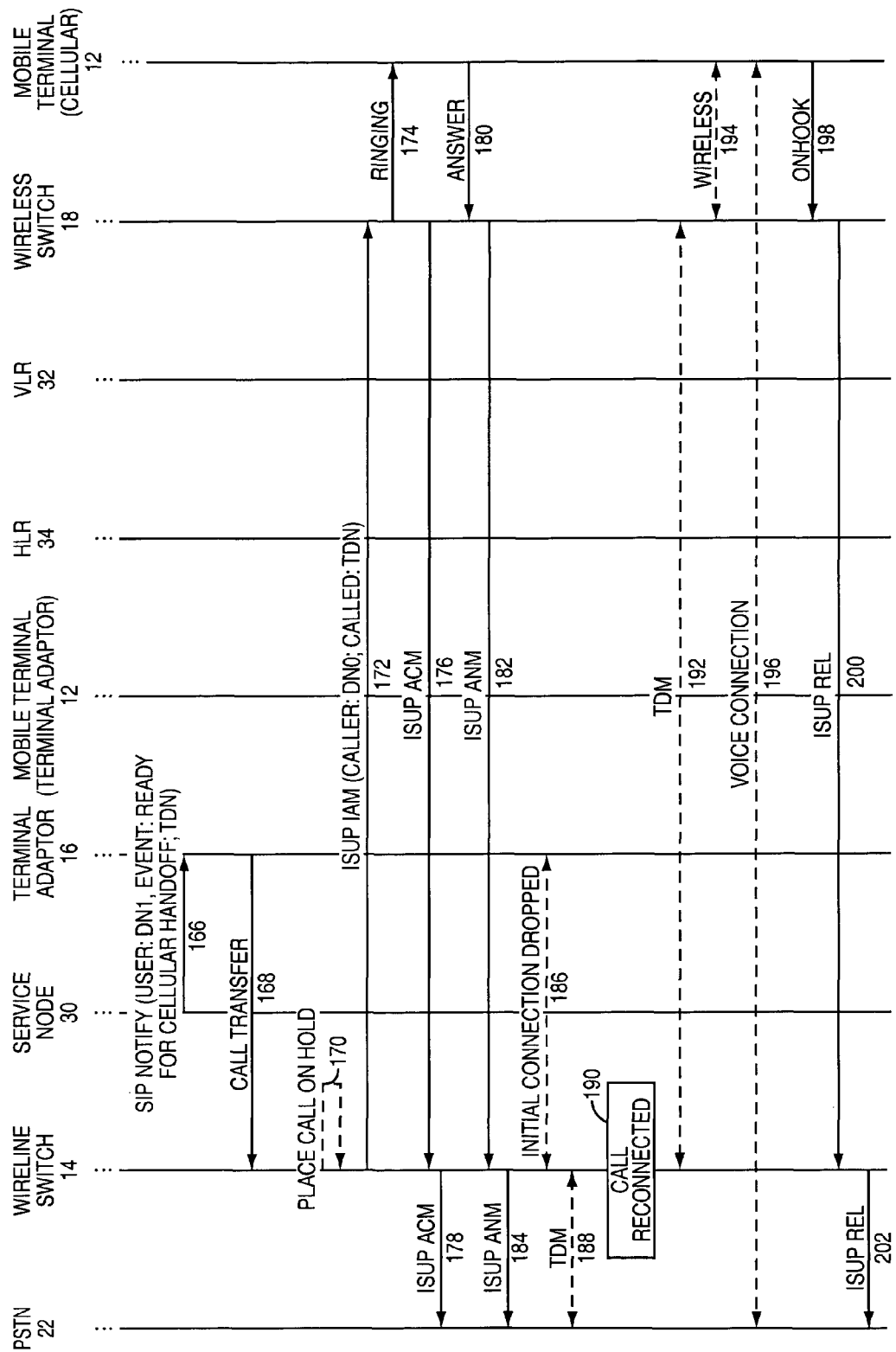

An exemplary communication flow for the above process is provided in FIGS. 2A-2C. Initially, assume the terminal adaptor 16 provides a paging signal within the terminal adaptor zone 24 (step 100), and the mobile terminal 12 receives the paging signal and responds with an appropriate response, such as a Hello message (step 102). At this point, the terminal adaptor 16 recognizes that the mobile terminal 12 is within the terminal adaptor zone 24. Upon receiving an incoming call for the mobile terminal 12, an Integrated Services User Protocol (ISUP) Initial Address Message (IAM) is received via the PSTN 22, and identifies the directory number DN1 associated with the mobile terminal 12. The ISUP IAM is received by the wireline switch 14 (step 104), which is provisioned to obtain routing instructions from the service node 30 using an Intelligent Network (IN) Termination Attempt Trigger (TAT), which will typically identify the directory numbers for the caller and called party (DN0 and DN1) (step 106).

The service node 30 may receive periodic updates from the terminal adaptor 16 identifying whether or not the mobile terminal 12 is within the terminal adaptor zone 24. Alternatively, the service node 30 may be configured to query the terminal adaptor 16 upon receiving the IN TAT to determine whether the mobile terminal 12 is within the terminal adaptor zone 24. In the illustrated embodiment, the service node 30 uses the Session Initiation Protocol (SIP) to send a SIP Invite message to the terminal adaptor 16 to effectively determine whether the mobile terminal 12 is within the terminal adaptor zone 24 (step 108). The SIP Invite is intended to establish a session with the terminal adaptor 16, but the terminal adaptor 16 will recognize that a connection via the wireline switch 14 is capable and respond with a SIP 380 Alternate Service message instructing the service node 30 to route the call via the PSTN through the wireline switch 14 (step 110). The service node 30 will receive the SIP 380 Alternate Service message, determine that the call should be routed through the wireline switch 14 and the terminal adaptor 16, and as such, send an IN Continue message to the wireline switch 14 (step 112), which will send a Ringing signal to the terminal adaptor 16 (step 114).

The terminal adaptor 16 will then take the necessary steps to cause the mobile terminal 12 to ring (step 116), as well as send an ISUP Address Complete Message (ACM) back to the wireline switch 14 (step 118), which will forward the ISUP ACM back to the PSTN 22 (step 120) to effectively alert the telephony switch supporting the calling terminal. When the mobile terminal 12 is answered (step 122), the terminal adaptor will send an ISUP Answer Message (ANM) to the wireline switch 14 (step 124), which will forward the ISUP ANM through the PSTN 22 toward the telephony switch of the caller (step 126) to establish a TDM connection between the caller's telephony switch and the wireline switch 14 (step 128). The wireline switch 14 and the terminal adaptor 16 will establish an analog connection over the telephony line (step 130), and the terminal adaptor 16 and the mobile terminal 12 will establish a wireless connection using wireless local area network (WLAN) technology (step 132). As such, a voice connection can be established from the caller to the mobile terminal 12 (step 134).

Assume at some point that the mobile terminal 12 begins moving out of the terminal adaptor zone 24 (step 136). Upon detecting this condition, the mobile terminal 12 will initiate registration with the cellular access network 20 by sending a registration message to the wireless switch 18 via the cellular access network 20 (step 138). Generally, the registration message will identify the mobile terminal 12 using a Mobile Identification Number (MIN) or the like. Upon receiving the registration message from the mobile terminal 12, the wireless switch 18 will send a Registration Notification (REGNOT) message identifying the mobile terminal 12 to the VLR 32 (step 140), which will forward the REGNOT message to the HLR 34 (step 142) to obtain the user's profile information, which essentially identifies the services and access to which the mobile terminal 12 is entitled. Accordingly, the HLR 34 will send a REGNOT response back to the VLR 32 providing the user profile information and associated MIN (step 144). The VLR 32 will forward the REGNOT response to the wireless switch 18 (step 146), which will send a Registration Acknowledgement (ACK) to the mobile terminal 12 (step 148) to let the mobile terminal 12 know that it has been successfully registered.

At some point when the mobile terminal 12 is leaving the terminal adaptor zone 24, the mobile terminal 12 may detect a weak signal that falls below a defined threshold, or simply detect a user request to transfer from the terminal adaptor 16 to the cellular access network 20, and send an appropriate message to the terminal adaptor 16 (step 150). The terminal adaptor 16, upon receiving the signal from the mobile terminal 12 or as it detects loss of communication with the mobile terminal 12, may send a SIP Notify message to the service node 30 to initiate the transfer. Preferably, the SIP Notify message will identify the directory number DN1 associated with the mobile terminal 12, as well as the type of transfer, in this case, a request to facilitate a handoff from the WLAN access to cellular access for the mobile terminal 12 (step 152). In response, the service node 30 will send a Location Request (LOCREQ) message including the directory number DN1 to the HLR 34 (step 154). The HLR 34 will respond by sending a Route Request (ROUTREQ) message for the MIN associated with the directory number DN1 to the VLR 32 (step 156), which will forward the ROUTREQ message to the wireless switch 18 to obtain the temporary directory number for the mobile terminal 12 (step 158).

The temporary directory number is associated with the registration for the mobile terminal 12. Accordingly, the wireless switch 18 will find the temporary directory number or provide the temporary directory number associated with the MIN and respond with a ROUTREQ response including the temporary directory number to the VLR 32 (step 160), which will forward the ROUTREQ response with the temporary directory number to the HLR 34 (step 162). The HLR 34 will respond to the original LOCREQ message by sending a LOCREQ response with the temporary directory number to the service node 30 (step 164). The service node 30 will then send a SIP Notify message identifying the temporary directory number and the directory number DN1 to the terminal adaptor 16 (step 166). The terminal adaptor 16 will send a message to request a call transfer for the call in progress to the temporary directory number (step 168). The wireline switch 14 will then place the call on hold (step 170) and initiate a connection through the wireless switch 18. The connection may be established by sending an ISUP IAM message identifying the caller (DN0) and the called party (TDN) to the wireless switch 18 (step 172). The wireless switch 18 will then initiate ringing of the mobile terminal 12 through the cellular access network 20 (step 174). The wireless switch 18 will also send an ISUP ACM back to the wireline switch 14 (step 176), which will forward the ISUP ACM back through the PSTN 22 toward the caller's telephony switch (step 178).

Once the mobile terminal 12 is answered (step 180), the wireless switch 18 will send an ISUP ANM back to the wireline switch 14 (step 182), which will forward the ISUP ANM back through the PSTN 22 (step 184). At this point, the wireline switch 14 will drop the initial connection via the terminal adaptor 16 (step 186) and establish a TDM connection with the caller's telephony switch (step 188). The wireline switch 14 will connect the original incoming call to the wireless switch 18 (step 190) over a TDM connection between the wireline switch 14 and the wireless switch 18 (step 192). A wireless connection is facilitated between the wireless switch 18 and the mobile terminal 12 via the cellular access network 20 (step 194). At this point, a voice connection is established between the mobile terminal 12 and the calling party (step 196), and the transfer is complete.

Once the call has ended, the mobile terminal 12 will send an Onhook signal to the wireless switch 18 (step 198), which will send an ISUP Release (REL) message back to the wireline switch 14 (step 200), which will forward it back through the PSTN 22 toward the caller's telephony switch (step 202) to tear down the connections necessary for the call. Although an exemplary embodiment is illustrated, those skilled in the art will recognize that the call transfer and registration initiation may be controlled or initiated by the terminal adaptor 16 or the mobile terminal 12, and that these entities may communicate with each other as necessary to effect such functionality.

Notably, signaling between the terminal adaptor 16 and the wireline switch 14 may be facilitated over the telephone line or via the data network 28, directly or through the service node 30. The manner in which signaling is provided to the wireline switch 14 is very flexible. Further, the mechanism with which to establish the second connection via the wireless network 14 in effecting the transition is also flexible. For example, if the telephone line is an ISDN Basic Rate Interface (BRI) line, the signaling channel associated with BRI line can be used to transmit the call transfer information to the wireline switch 14.

Figure 3:
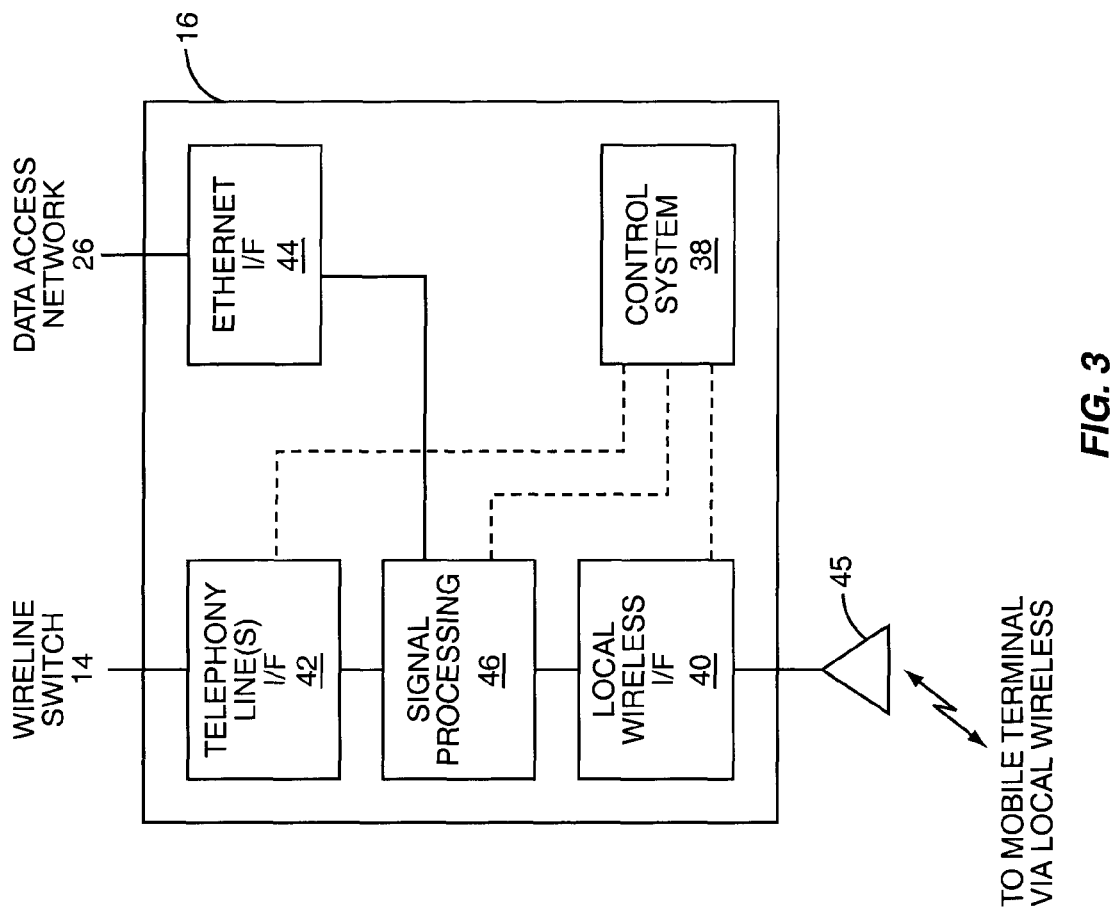
FIG. 3 is a block representation of a terminal adaptor according to one embodiment of the present invention.

A block representation of the terminal adaptor 16 is provided in FIG. 3. Preferably, the terminal adaptor 16 will include a control system 38 operatively associated with a local wireless interface 40, one or more telephony line interfaces 42, an Ethernet interface 44, and a signal processing function 46. The signal processing function 46 is part of the control system 38, and is capable of providing all the necessary coding, decoding, and conversions necessary for either of the telephony line interface 42 and Ethernet interface 44 to operate with the local wireless interface 40. The local wireless interface 40 is associated with an antenna 45, and is configured to communicate wirelessly with the mobile terminal 12 using any applicable wireless technology, such as traditional analog or digital cordless technology, wireless local area network technology including 802.11-based technologies, and Bluetooth technology.

Clearly, the mobile terminal 12 must be equipped with a compatible interface and be configured to cooperate with the terminal adaptor 16 to facilitate normal telephone operation. As such, the terminal adaptor 16 and the mobile terminal 12 must cooperate such that the mobile terminal 12 knows when to ring, the terminal adaptor 16 knows when the mobile terminal 12 has been answered or ends a call, and the mobile terminal 12 receives any caller identification or like messaging intended for the user or necessary by the mobile terminal 12 for operation. Further, the local wireless interface 40, alone or in conjunction with the control system 38, must be able to periodically or continuously detect whether the mobile terminal 12 is within communication range, and thus within the terminal adaptor zone 24. Those skilled in the art will recognize numerous techniques for the mobile terminal 12 and terminal adaptor 16 to cooperate with one another to determine whether or not communications are possible.

Figure 4:
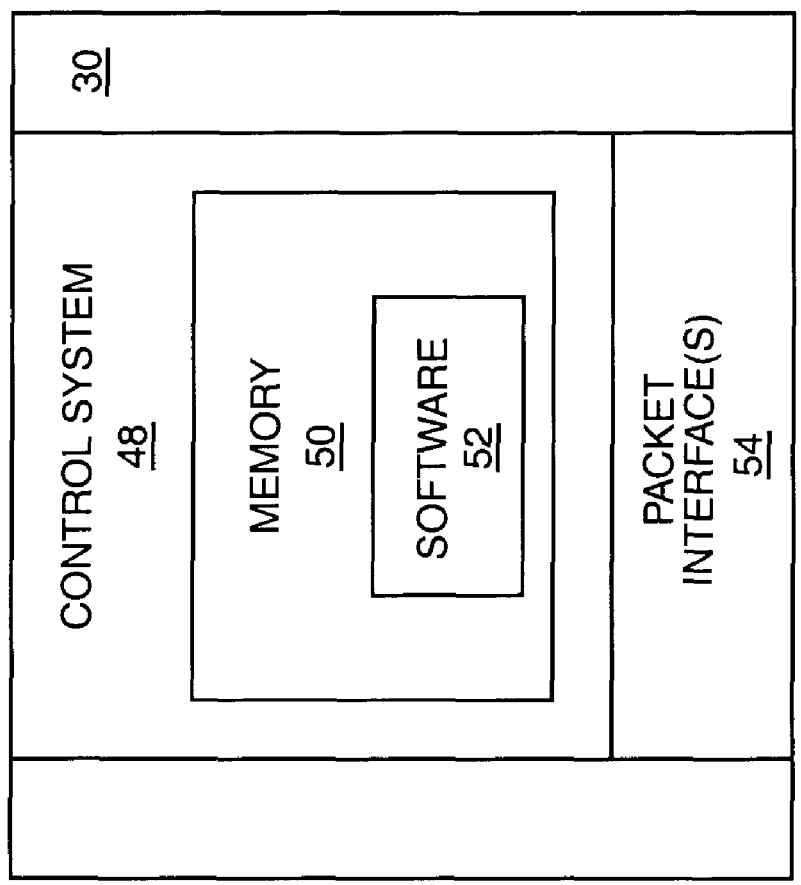
FIG. 4 is a block representation of a service node according to one embodiment of the present invention.

Turning now to FIG. 4, a block diagram of a service node 30 is illustrated. The service node 30 will preferably include a control system 48 having sufficient memory 50 to store the software 52 necessary for operation as described above. The control system 48 is also associated with one or more packet interfaces 54 to facilitate communications with the terminal adaptor 28 via the data network 16, as well as directly or indirectly with the wireline switch 14.

Figure 5:
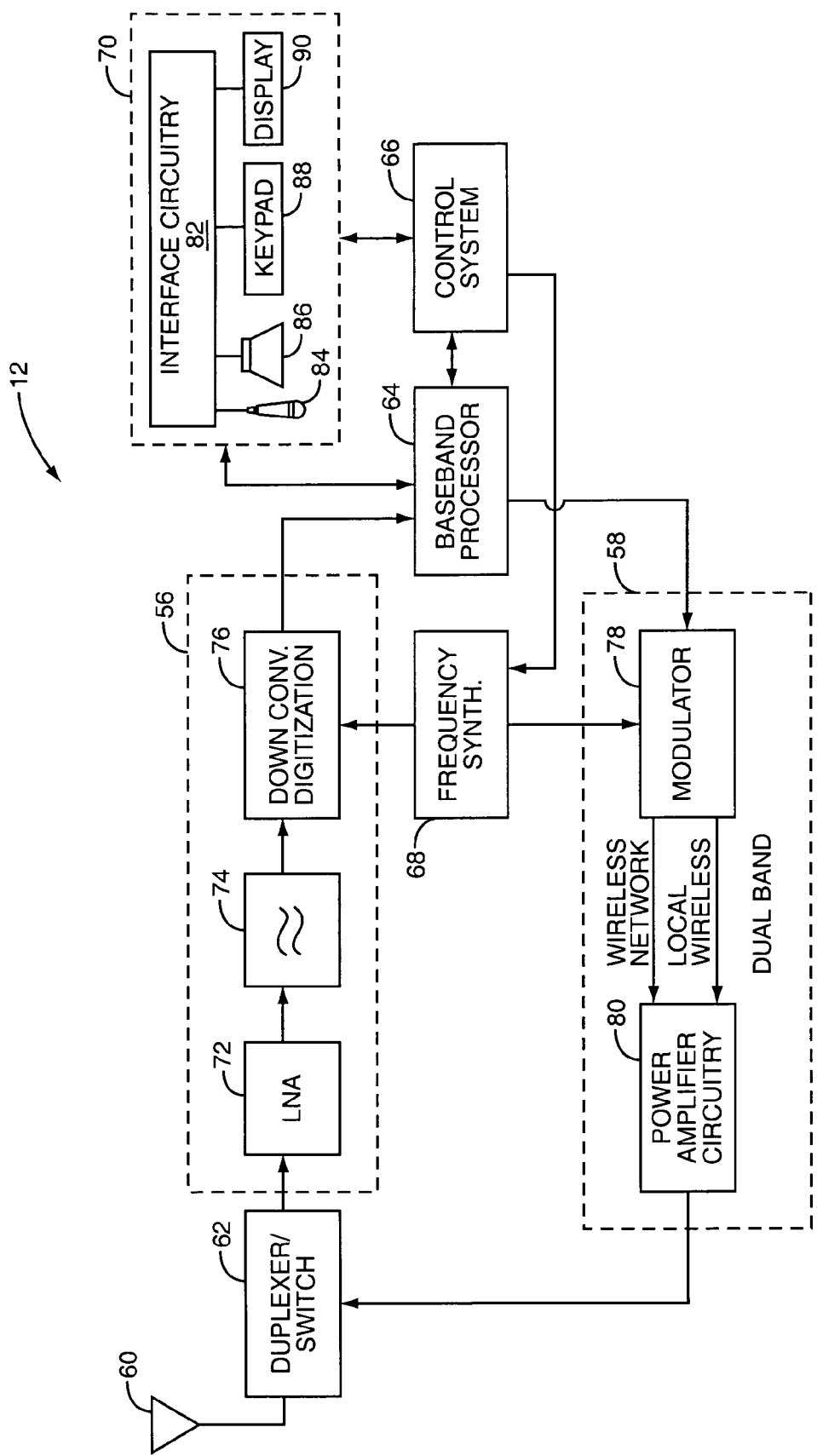
FIG. 5 is a block representation of a mobile terminal according to one embodiment of the present invention.

The basic architecture of the mobile terminal 12 is represented in FIG. 5 and may include a receiver front end 56, a radio frequency transmitter section 58, an antenna 60, a duplexer or switch 62, a baseband processor 64, a control system 66, a frequency synthesizer 68, and an interface 70. The receiver front end 56 receives information bearing radio frequency signals from one or more remote transmitters provided by a base station. A low noise amplifier 72 amplifies the signal. A filter circuit 74 minimizes broadband interference in the received signal, while downconversion and digitization circuitry 76 downconverts the filtered, received signal to an intermediate or baseband frequency signal, which is then digitized into one or more digital streams. The receiver front end 56 typically uses one or more mixing frequencies generated by the frequency synthesizer 68. The baseband processor 64 processes the digitized received signal to extract the information or data bits conveyed in the received signal. This processing typically comprises demodulation, decoding, and error correction operations. As such, the baseband processor 64 is generally implemented in one or more digital signal processors (DSPs).

On the transmit side, the baseband processor 64 receives digitized data, which may represent voice, data, or control information, from the control system 66, which it encodes for transmission. The encoded data is output to the transmitter 58, where it is used by a modulator 78 to modulate a carrier signal that is at a desired transmit frequency. Power amplifier circuitry 80 amplifies the modulated carrier signal to a level appropriate for transmission, and delivers the amplified and modulated carrier signal to the antenna 60 through the duplexer or switch 62.

As noted above, the mobile terminal 12 must be able to communicate with the terminal adaptor 16 as well as with the cellular access network 20. Accordingly, the receiver front end 56, baseband processor 64, and radio frequency transmitter section 58 cooperate to provide either a cellular interface for the wireless access network 20 and the local wireless interface 40 for the terminal adaptor 16. These functions may be implemented using redundant circuitry, or by configuring common circuitry to operate in different modes. The configuration of the mobile terminal 12 will be dictated by economics and designer choice. The mobile terminal 12 is configured such that if the local wireless interface 40 is not functional, communications are switched to the wireless network interface. Alternatively, the mobile terminal 12 could have both the local wireless interface 40 and the wireless network interface in operation at the same time and select one of the two for communication at any given time based on signal quality, registration, or other factors.

A user may interact with the mobile terminal 12 via the interface 70, which may include interface circuitry 82 associated with a microphone 84, a speaker 86, a keypad 88, and a display 90. The interface circuitry 82 typically includes analog-to-digital converters, digital-to-analog converters, amplifiers, and the like. Additionally, it may include a voice encoder/decoder, in which case it may communicate directly with the baseband processor 64. The microphone 84 will typically convert audio input, such as the user's voice, into an electrical signal, which is then digitized and passed directly or indirectly to the baseband processor 64. Audio information encoded in the received signal is recovered by the baseband processor 64, and converted by the interface circuitry 82 into an analog signal suitable for driving the speaker 86. The keypad 88 and display 90 enable the user to interact with the mobile terminal 12, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A system comprising:
   a) a wireline network interface;
   b) a local wireless interface providing a communication zone in which communications with a mobile terminal are possible, the mobile terminal associated with a primary directory number associated with a wireline network and adapted to communicate with the local wireless interface to facilitate a call through the wireline network and communicate with a cellular wireless network to facilitate a call through the cellular wireless network; and
   c) a control system cooperating with the wireline network interface and the local wireless interface and adapted to:
      i) use the primary directory number associated with the wireline network to establish through the wireline network a first call involving the mobile terminal by communicating with the wireline network via the wireline network interface and communicating with the mobile terminal via the local wireless interface;
      ii) during the first call, detect the mobile terminal moving out of the local wireless communication zone; and
      iii) initiate a transition of the first call being connected to the mobile terminal through the wireline network via the local wireless interface to the first call being connected to the mobile terminal through the cellular wireless network using a temporary directory number provided by a visited wireless switch currently providing cellular wireless access for the mobile terminal.

2. The system of claim 1 wherein the mobile terminal is registered with the cellular wireless network while the first call is established and the temporary directory number is assigned to the mobile terminal by the visited wireless switch upon registration.

3. The system of claim 1 wherein the transition is initiated by sending a message configured to initiate establishing a wireless network connection to the mobile terminal through the cellular wireless network using the temporary directory number associated with the mobile terminal; connecting the first call to the wireless network connection, and dropping a wireline network connection with the mobile terminal.

4. The system of claim 1 wherein the wireline network interface is a traditional telephony line interface.

5. The system of claim 1 wherein the wireline network interface is a voice over packet interface.

6. The system of claim 1 wherein the cellular wireless network is one of the group consisting of TDM, CDMA, and OFDM.

7. The system of claim 1 wherein the transition is initiated by sending a message intended for a wireline switch and configured to cause the wireline switch to transfer the first call to the mobile terminal through the cellular wireless network using the temporary directory number.

8. The system of claim 1 wherein the transition is initiated by sending a message intended for a wireline switch and configured to cause the wireline switch to establish a three-way call based on the first call to the mobile terminal through the cellular wireless network using the temporary directory number.

9. The system of claim 8 wherein the control system is further adapted to send a second message intended for the wireline switch and configured to instruct the wireline switch to drop a wireline network connection.

10. The system of claim 1 wherein the mobile terminal is also associated with a wireline network directory number, such that incoming calls for the mobile terminal directed to the wireline network directory number are established via the wireline network and incoming calls for the mobile terminal directed to the temporary directory number are established via the cellular wireless network.

11. The system of claim 1 wherein the control system includes a signal processing function adapted to provide any necessary conversion of signals between the wireline network interface and the local wireless interface.

12. The system of claim 1 wherein the control system is adapted to detect the mobile terminal moving out of the communication zone by detecting a bit error rate associated with communications with the mobile terminal via the local wireless interface surpassing a defined threshold.

13. The system of claim 1 wherein the control system is adapted to detect the mobile terminal moving out of the communication zone by detecting a degradation in quality associated with communications with the mobile terminal via the local wireless interface surpassing a defined threshold.

14. The system of claim 1 wherein the control system is adapted to detect the mobile terminal moving out of the communication zone by detecting an inability to communicate with the mobile terminal via the local wireless interface.

15. The system of claim 1 wherein the control system is adapted to detect the mobile terminal moving out of the communication zone by detecting a decrease in signal strength associated with communications with the mobile terminal via the local wireless interface surpassing a defined threshold.

16. The system of claim 1 wherein the local wireless interface is adapted to support communications with the mobile terminal using cordless telephone technology.

17. The system of claim 1 wherein the local wireless interface is adapted to support communications with the mobile terminal using wireless local area network telephone technology.

18. The system of claim 17 wherein the wireless local area network technology is based on 802.11 standards.

19. The system of claim 1 wherein the local wireless interface is adapted to support communications with the mobile terminal using Bluetooth technology.

20. The system of claim 1 wherein the control system is further adapted to detect a signal from the mobile terminal and initiate the transition of the first call being connected to the mobile terminal through the wireline network via the local wireless interface to the first call being connected to the mobile terminal through the cellular wireless network, the signal from the mobile terminal responsive to a user of the mobile terminal requesting the transition.

21. The system of claim 1, wherein a visiting location register is associated with the visited wireless switch and accesses the temporary directory number from the visited wireless switch and provides the temporary directory number directly or indirectly via a home location register to a wireline switch in the wireline network.

22. A method of handling calls involving a mobile terminal adapted to communicate with a local wireless interface to facilitate a call through a wireline network and communicate with a cellular wireless network to facilitate a call through the cellular wireless network, the method comprising:
  a) using a primary directory number associated with the wireline network to establish through the wireline network a first call involving the mobile terminal by communicating with the wireline network via a wireline network interface and communicating with the mobile terminal via the local wireless interface;
  b) during the first call, detecting the mobile terminal moving out of a communication zone associated with the local wireless interface; and
  c) initiating a transition of the first call being connected to the mobile terminal through the wireline network via the local wireless interface to the first call being connected to the mobile terminal through the cellular wireless network using a temporary directory number provided by a visited wireless switch currently providing cellular wireless access for the mobile terminal.

23. The method of claim 22 wherein the mobile terminal is registered with the cellular wireless network while the first call is established and the temporary directory number is assigned to the mobile terminal by the visited wireless switch upon registration.

24. The method of claim 22 wherein initiating the transition comprises sending a message configured to initiate establishing a wireless network connection to the mobile terminal through the cellular wireless network using the temporary directory number associated with the mobile terminal; connecting the first call to the wireless network connection, and dropping a wireline network connection with the mobile terminal.

25. The method of claim 22 wherein initiating the transition comprises sending a message intended for a wireline switch and configured to cause the wireline switch to transfer the first call to the mobile terminal through the cellular wireless network using the temporary directory number.

26. The method of claim 22 wherein initiating the transition comprises sending a message intended for a wireline switch and configured to cause the wireline switch to establish a three-way call based on the first call to the mobile terminal through the cellular wireless network using the temporary directory number.

27. The method of claim 26 further comprising sending a second message intended for the wireline switch and configured to instruct the wireline switch to drop a wireline network connection.

28. The method of claim 22 wherein the mobile terminal is also associated with a primary network directory number, such that incoming calls for the mobile terminal directed to the primary directory number are established via the wireline network and incoming calls for the mobile terminal directed to the temporary directory number are established via the cellular wireless network.

29. The method of claim 22 further comprising providing any necessary conversion of signals between the wireline network interface and the local wireless interface.

30. The method of claim 22 further comprising detecting the mobile terminal moving out of the communication zone by detecting a bit error rate associated with communications with the mobile terminal via the local wireless interface surpassing a defined threshold.

31. The method of claim 22 further comprising detecting the mobile terminal moving out of the communication zone by detecting a degradation in quality associated with communications with the mobile terminal via the local wireless interface surpassing a defined threshold.

32. The method of claim 22 further comprising detecting the mobile terminal moving out of the communication zone by detecting an inability to communicate with the mobile terminal via the local wireless interface.

33. The method of claim 22 further comprising detecting the mobile terminal moving out of the communication zone by detecting a decrease in signal strength associated with communications with the mobile terminal via the local wireless interface surpassing a defined threshold.

34. The method of claim 22 wherein the local wireless interface supports communications with the mobile terminal using cordless telephone technology.

35. The method of claim 22 wherein the local wireless interface supports communications with the mobile terminal using wireless local area network technology.

36. The method of claim 35 wherein the wireless local area network technology is based on 802.11 standards.

37. The method of claim 22 wherein the local wireless interface supports communications with the mobile terminal using Bluetooth technology.

38. The method of claim 22 further comprising inserting a signal into a voice path for the first call prior to initiating the transition to warn parties to the first call of a transfer.

39. The method of claim 22 further comprising detecting a signal from the mobile terminal and initiating the transition of the first call being connected to the mobile terminal through the wireline network via the local wireless interface to the first call being connected to the mobile terminal through the cellular wireless network, the signal from the mobile terminal responsive to a user of the mobile terminal requesting the transition.

40. The method of claim 22, wherein a visiting location register is associated with the visited wireless switch and accesses the temporary directory number from the visited wireless switch and provides the temporary directory number directly or indirectly via a home location register to a wireline switch in the wireline network.

* * * * *